March 25, 1947.  C. G. MUNGER  2,417,881
METHOD OF MAKING PLASTIC-METAL PIPE
Filed Dec. 13, 1943
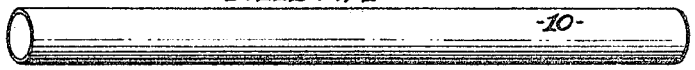
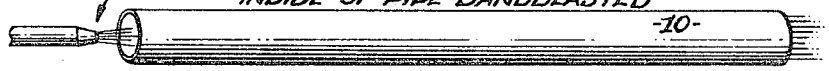
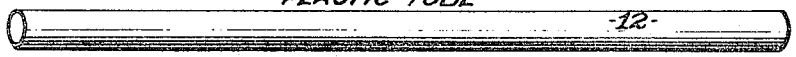
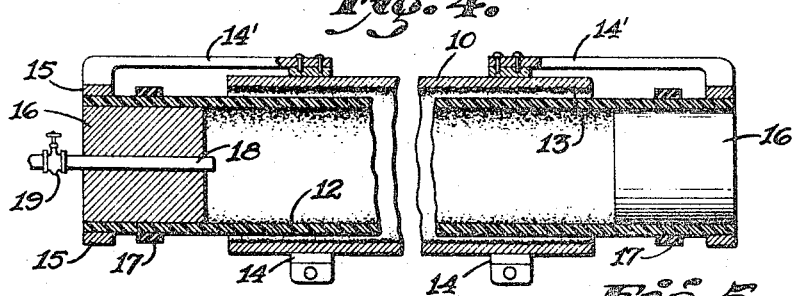
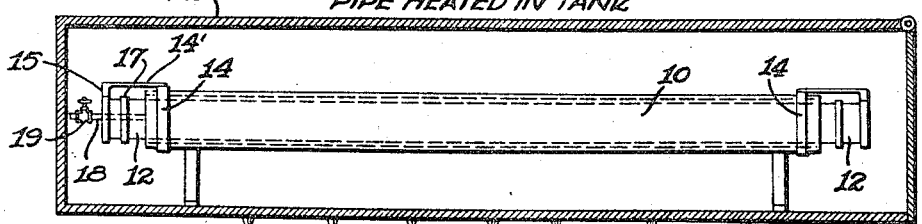
CHARLES G. MUNGER,
INVENTOR.
BY
ATTORNEY Patented Mar. 25, 1947

2,417,881

UNITED STATES PATENT OFFICE 2,417,881

METHOD OF MAKING PLASTIC-METAL PIPE

Charles G. Munger, San Gabriel, Calif., assignor to American Pipe and Construction Co., a corporation of Delaware Application December 13, 1943, Serial No. 514,179

1 Claim. (Cl. 154—82)

This invention relates to composite plastic-metal pipes and the method of making such composite pipes which consist of a metal pipe having a plastic inner tube bonded to the pipe.

The uses of such plastic lined pipes are extremely wide. They may be used in any place where chemicals or food products must be kept free from iron or other metal contamination or where the metal pipe must be kept completely free from contact with corrosive chemicals. As illustrations, the composite pipe may be used in the wine industry to transport wine throughout the winery as it is necessary to protect the wine from any iron or copper contamination. This is also true for brandies and other distilled liquors. This type of pipe can also be used by the milk industry and other food industries where contamination is to be avoided.

In the chemical industry the composite pipe, herein described, is particularly useful as, for instance, where caustic must be kept free of iron contamination also in the case of transporting of acids of all kinds, corrosive solvents and alkalis.

It is the object of this invention to produce a simple form of plastic-metal pipe and a simple and economical method of making such pipes.

The pipe, made by the method herein disclosed, consists of a metal pipe having a tube of plastic bonded to the interior of the pipe thereby forming a plastic conveyor for materials. The plastics contemplated are of the thermoplastic type, which plastic materials soften under heat and pressure and on cooling return to their original condition and the thermosetting plastics which after setting are not subject to softening by the application of heat. In order to provide a plastic tube suitable for the purposes of the present invention, it is desirable to combine the plastic with pigments or plasticizers or both. Any well known pigments or plasticizers may be used to render the plastic tube more impervious to water and chemicals and thus be completely inert.

The plasticizers used are in general resinous plasticizers which tend to increase the water and chemical resistance of the tube combined with a plasticizer which increases the workability and flexibility of the tube. These materials are all thoroughly mixed prior to extrusion and when extruded make a completely homogeneous, seamless plastic tube.

It is to be understood, however, that the term "plastic" as used herein, is not limited to any particular composition but is intended to include all such materials as synthetic and natural resins, polymers and elastomers.

Referring to the drawings, which are merely illustrative of the steps of the method:

Fig. 1 is a perspective view of a steel pipe to be lined;

Fig. 2 is a perspective view of a steel pipe showing the step of sandblasting the interior of the pipe;

Fig. 3 is a perspective view of a plastic tube such as is used in the method herein described;

Fig. 4 is a fragmentary enlarged sectional view illustrating the step in the method in which pressure is applied to the interior of the plastic tube;

Fig. 5 is a diagrammatic view, partly in section, showing the unit disclosed in Fig. 4 as placed within a gas heated oven; and Fig. 6 is a diagrammatic perspective view of a short section of the finished composite pipe.

The method of producing the composite plastic-metal pipe when a thermoplastic plastic is used, is as follows: The inside of the metal pipe indicated at 10 is first cleaned either by passing an air blast containing sand indicated at 11 in Fig. 2 through the pipe or by dipping the pipe in a standard pickling bath, for instance, when the pipe is of steel the bath should preferably consist of hot sulphuric acid; should the steel pipe be etched, as just referred to, it would be preferable to pacify the steel to prevent it from rusting prior to the installation of the plastic tube or liner. This process consists of dipping the pipe in phosphoric acid-chromic acid solution followed by washing and drying.

After the cleaning of the interior of the metal pipe, as just described, a coating of plastic adhesive indicated at 13 in Fig. 4 is applied to the interior of the pipe. The coating is applied to the pipe by dipping, allowed to drain and then thoroughly drying the coating by stacking the pipes and blowing air through the pipe or by allowing a short preliminary drying time and then heating the pipe to bake the coating on the interior. The plastic tube 12 is then inserted in the metal pipe. This plastic tube or liner is very slightly smaller than the inside diameter of the pipe and is merely slipped into the pipe extending preferably from end to end of the pipe.

The plastic tube 12 is preferably supported with its outer surface spaced apart from the inner surface. This is done with the following apparatus. Bands indicated at 14 are clamped around the pipe 10 near its ends. Each of these bands has attached thereto a bracket indicated at 14¹ to the outer end of which is secured a ring 15. This ring receives the end of the plastic tube, Inserted within the ends of the tube are plugs indicated at 16. The plastic tube is pressed about the plug 16 by means of yieldable bands indicated at 17. Extending through one of the plugs 16 is a pipe indicated at 18 and provided with a valve 19 through which air or liquid under pressure is introduced to the interior of the plastic tube 12. Air or other pressure is then applied to the interior of the plastic tube through the pipe 18, such pressure ordinarily running from 25 to 100 pounds per square inch.

The unit, that is, the metal pipe with the plastic liner, with the pressure still in the tube, is then placed in an oil bath or a hot air furnace indicated at 22 and heated to the degree that with the pressure therein the plastic tube expands and makes a completely intimate contact or bond with the steel pipe. I have found that it is only necessary to heat the unit for approximately fifteen minutes and then it is taken out of the heating chamber, stacked and allowed to cool to room temperature with the air pressure still remaining on the interior of the unit. After the unit is cooled the air pressure is removed and the unit is ready for use. The same procedure is followed when the plastic of the tube is of the thermo-setting type with this difference that the plastic tube is introduced into the metal pipe before the plastic of the tube has reached a final setting. This method, by reason of heat and pressure, as above outlined, causes the tube to expand into contact with the walls of the pipe and become bonded thereto.

Plastic lined steel or other metal pipe, that is, a plastic tube reinforced by a metal pipe bonded thereto, as herein described, has many advantages over plastic tubes and pipes in that it is rigid, will stand the same pressure as the standard steel pipe and may be used in any size rather than being limited as is the case of plastic tubes.

Plastic lined metal pipes, made as described herein, may be installed easily by the ordinary methods of installing steel and other metal pipes.

The plastic liner in the pipe is permanently bonded to the steel making an inseparable unit and thus in fact, giving the composite pipe all the advantages of the ordinary plastic pipe together with the added strength and other qualities mentioned herein.

It is contemplated that various modifications and changes can be made in the invention as shown and described herein without departing from the scope of the invention and it is intended to cover such changes and modifications as come within the scope of the claim.

I claim as my invention:

The method of making a composite plastic-metal pipe unit which comprises: cleaning the interior surface of the pipe, applying to the cleaned surface a coating of plastic adhesive, inserting a rigid, imperforate, thermoplastic resin tube axially into the pipe, simultaneously applying fluid pressure to the tube interior and heating the unit to progressively expand and bond the tube to the pipe interior, while supporting the tube exclusively at its ends in a manner to maintain an unobstructed annular air evacuation space between the pipe and the unbonded portions of the exterior surface of the tube, and then cooling the unit while maintaining fluid pressure within the tube.

CHARLES G. MUNGER.

REFERENCES CITED

The following references are of record in the file of this patent:

UNITED STATES PATENTS

| Number | Name | Date |
| --- | --- | --- |
| 2,006,226 | Yaxley | June 25, 1935 |
| 2,312,993 | Stephens | Mar. 2, 1943 |
| 2,343,225 | Pray et al | Feb. 29, 1944 |

FOREIGN PATENTS

| Number | Country | Date |
| --- | --- | --- |
| 323,054 | British | Dec. 24, 1929 |